(12) United States Patent
Hindi et al.

(10) Patent No.: US 7,667,203 B2
(45) Date of Patent: Feb. 23, 2010

(54) GAMMA VECTOR CAMERA

(75) Inventors: Munther M. Hindi, Campbell, CA (US); Lee M. Klynn, Los Altos, CA (US); Howard P. Demroff, Palo Alto, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/837,454

(22) Filed: Aug. 10, 2007

(65) Prior Publication Data

US 2008/0210875 A1 Sep. 4, 2008

Related U.S. Application Data

(63) Continuation-in-part of application No. 10/866,760, filed on Jun. 15, 2004, now Pat. No. 7,274,020.

(60) Provisional application No. 60/484,850, filed on Jul. 3, 2003.

(51) Int. Cl.
  *G01T 1/20* (2006.01)
  *G01T 1/24* (2006.01)
(52) U.S. Cl. .............. 250/363.01; 250/370.09
(58) Field of Classification Search ............ 250/363.01, 250/363.04, 366, 367, 370.08, 370.09, 307, 250/363.02, 363.03, 370.01
See application file for complete search history.

(56) References Cited

U.S. PATENT DOCUMENTS

| | | | |
|---|---|---|---|
| 4,377,751 A | 3/1983 | Kronenberg et al. | |
| 4,942,302 A * | 7/1990 | Koechner | 250/368 |
| 5,103,098 A * | 4/1992 | Fenyves | 250/368 |
| 5,410,156 A | 4/1995 | Miller et al. | |
| 5,446,286 A | 8/1995 | Bhargava | |
| 5,665,971 A | 9/1997 | Chen et al. | |
| 5,821,541 A | 10/1998 | Tümer | |
| 5,943,388 A | 8/1999 | Tümer | |
| 6,281,509 B1 * | 8/2001 | Ryan et al. | 250/397 |
| 6,420,711 B2 | 7/2002 | Tümer | |

(Continued)

OTHER PUBLICATIONS

Terasawa, et al., "A Small Scintillating Fiber Camera Consisting of 0.25-mm Square Fibers for Space Dosimetry," IEEE Transactions On Nuclear Science, Aug. 2001, pp. 1118-1121, vol. 48, No. 4.

(Continued)

*Primary Examiner*—David P Porta
*Assistant Examiner*—Faye Boosalis
(74) *Attorney, Agent, or Firm*—McDermott Will & Emery LLP

(57) ABSTRACT

A gamma vector camera is described for detecting and determining the energy spectrum of a gamma ray source and the direction to the gamma ray source. The gamma vector camera includes a detection system that records a track of a recoil electron produced by a Compton-scattering of an incident gamma ray emitted by the gamma ray source. A processor is configured to determine the energy and the direction of the recoil electron based on the track of the recoil electron recorded by the detection system, and to determine the energy spectrum of the gamma ray source and the direction to the gamma ray source based on the determined energies and directions of a plurality of recoil electrons produced by the Compton-scatterings of a respective plurality of incident gamma rays.

22 Claims, 14 Drawing Sheets

U.S. PATENT DOCUMENTS

| | | | |
|---|---|---|---|
| 6,484,051 | B1 | 11/2002 | Daniel |
| 6,528,795 | B2 | 3/2003 | Kurfess et al. |
| 6,693,291 | B2 | 2/2004 | Nelson et al. |
| 6,710,349 | B2 | 3/2004 | Shao |
| 6,737,103 | B2 | 5/2004 | Polichar et al. |
| 6,775,348 | B2 | 8/2004 | Hoffman |
| 6,906,559 | B2 * | 6/2005 | Tumer .................... 327/96 |
| 6,989,541 | B2 | 1/2006 | Penn |
| 7,274,020 | B1 | 9/2007 | Hindi et al. |
| 2004/0174950 | A1 | 9/2004 | Polichar et al. |
| 2006/0049357 | A1 | 3/2006 | Tümer |
| 2006/0049362 | A1 | 3/2006 | Friedman et al. |
| 2006/0202125 | A1 * | 9/2006 | Suhami .................... 250/368 |

OTHER PUBLICATIONS

Ryan, et al., "SONTRAC: An Imaging Spectrometer for Solar Neutrons," Proceedings of SPIE, 2003, pp. 399-410, vol. 4853.

Wulf, et al., "Thick Silicon Strip Detector Compton Imager," IEEE Transactions On Nuclear Science, Oct. 2004, pp. 1997-2003, vol. 51, No. 5.

Bravar, et al., "FNIT: The Fast Neutron Imaging Telescope for SNM Detection," Proc. of SPIE, 2006 pp. 62130G 1—9, vol. 6213.

* cited by examiner

GAMMA VECTOR CAMERA

This application is a continuation-in-part of U.S. application Ser. No. 10/866,760 filed on Jun. 15, 2004 now U.S. Pat. No 7,274,020, which claims the benefit of U.S. Provisional Application No. 60/484,850 filed on Jul. 3, 2003, both of which are hereby incorporated by reference.

STATEMENT AS TO RIGHTS TO INVENTIONS MADE UNDER FEDERALLY SPONSORED RESEARCH OR DEVELOPMENT

The U.S. Government has a paid-up license in this invention and the right in limited circumstances to require the patent owner to license others on reasonable terms.

FIELD OF THE INVENTION

The invention generally concerns radiation detection, and more particularly concerns a gamma vector camera for detecting and determining the energy spectrum and the direction to a gamma ray source.

BACKGROUND OF THE INVENTION

Radiation detection technology plays a significant role in health and safety applications. These applications include diagnostic systems used for medical imaging or non-destructive testing. Safety applications include systems used for mapping hot spots after nuclear accidents and for monitoring leakage of radioactive waste during storage or transportation. As the amount and availability of nuclear material increases throughout the world, the need to detect and identify dirty bombs and nuclear weapons places greater demands on the development of radiation detection technology.

Radioactive material, such as that used in dirty bombs or nuclear weapons, emits gamma rays. The ability to detect the presence of gamma rays and locate their source is necessary to monitor and control the movement of radioactive material. Conventional radiation detection technologies have significant disadvantages that limit this ability. For example, conventional systems based on pinhole camera designs have relatively low sensitivity since only a small portion of gamma rays emitted by a gamma ray source pass through the aperture to reach the detector. Additionally, conventional systems typically have a limited field of view which requires some prior knowledge on the general location of the gamma ray source in order to detect and locate it. In situations where a number of cargo containers, cars, baggage, persons, etc. are being monitored, conventional radiation detection systems often involve inspecting each potential carrier individually in close proximity to the detection system. This arrangement strains available resources and is not ideal in areas where a large number of potential carriers are passing through.

SUMMARY OF THE INVENTION

The invention provides a gamma vector camera that uses single Compton-scatterings of incident gamma rays to determine the energy spectrum of the gamma ray source and the direction to the source. The tracks of recoil electrons produced by the Compton-scatterings of incident gamma rays are recorded and reconstructed to determine the energies and directions of the recoil electrons. Using multiple recoil electrons produced by multiple incident gamma rays being Compton-scattered within the gamma vector camera, the energy spectrum of the gamma ray source and the direction to the gamma ray source can be determined without requiring multiple events for each incident gamma ray, such as multiple Compton-scatterings or a combination of Compton-scatterings and photo-absorption. The single Compton-scattering process described herein allows the gamma vector camera to be smaller in size compared to other gamma ray imaging systems that require either multiple Compton-scatterings of an incident gamma ray or a combination of Compton-scatterings and photo-absorption of the incident gamma ray.

According to one aspect of the invention, a gamma vector camera is provided for detecting and determining the energy spectrum of a gamma ray source and the direction to the gamma ray source. The gamma vector camera includes a detection system that is configured to record a track of a recoil electron produced by a Compton-scattering of an incident gamma ray emitted by the gamma ray source. A processor is configured to determine the energy and the direction of the recoil electron based on the track of the recoil electron recorded by the detection system, and to determine the energy spectrum of the gamma ray source and the direction to the gamma ray source based on the determined energies and directions of a plurality of recoil electrons produced by the Compton-scatterings of a respective plurality of incident gamma rays.

According to another aspect of the invention, a method for detecting and determining the energy and the direction of a gamma ray source is provided. The method includes recording the tracks of a plurality of recoil electrons produced by Compton-scatterings of a respective plurality of incident gamma rays emitted by the gamma ray source and determining the energies and the directions of the plurality of recoil electrons using the recorded recoil electron tracks. The energy spectrum of the gamma ray source and the direction to the gamma ray source are determined using the determined energies and directions of the plurality of recoil electrons.

According to another aspect of the invention, a computer-readable medium having computer-executable instructions stored thereon for execution by a processor to perform a method for determining the energy spectrum of a gamma ray source and the direction to the gamma ray source is provided. The method includes recording the tracks of a plurality of recoil electrons produced by Compton-scatterings of a respective plurality of incident gamma rays emitted by the gamma ray source and determining the energies and the directions of the plurality of recoil electrons using the recorded recoil electron tracks. The energy spectrum of the gamma ray source and the direction to the gamma ray source are determined using the determined energies and directions of the plurality of recoil electrons.

The foregoing summary of the invention has been provided so that the nature of the invention can be understood quickly. A more detailed and complete understanding of the preferred embodiments of the invention can be obtained by reference to the following description of the invention together with the associated drawings.

DETAILED DESCRIPTION OF THE INVENTION

The detailed description of the invention set forth below in connection with the associated drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without all of the specific details contained herein. In some instances, well known structures and components are shown in block diagram form in order to avoid obscuring the concepts of the invention.

Figure 1:
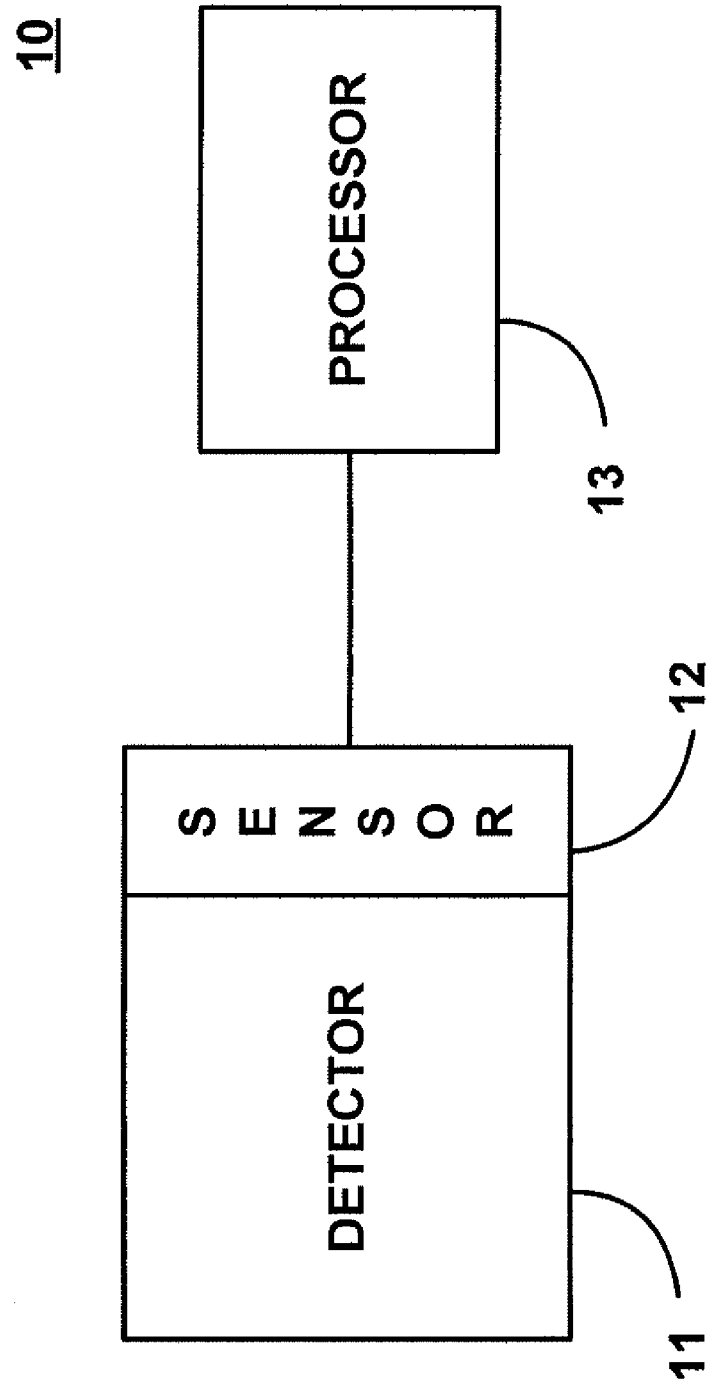
FIG. 1 is a block diagram depicting basic components of a gamma vector camera according to one embodiment of the invention.

FIG. 1 is a block diagram depicting basic components of a gamma vector camera according to one embodiment of the invention. As shown in FIG. 1, gamma vector camera 10 includes a detector 11, a sensor 12 and a processor 13. Detector 11 and sensor 12 are part of a detection system configured to detect and record a track of a recoil electron produced by the Compton-scattering of an incident gamma ray. Detector 11 is constructed to Compton-scatter incident gamma rays and interact with the produced recoil electrons so as to facilitate detection of the recoil electron tracks. Sensor 12 records the recoil electron tracks detected in detector 11. Using the recorded recoil electron tracks, processor 13 is configured to determine the energies and the directions of the recoil electrons. These energies and directions are then used to determine the energy spectrum of the source of the incident gamma rays and the direction to the gamma ray source. The components of gamma vector camera 10, together with their associated operating processes, are described in more detail below.

The operation of gamma vector camera 10 is based on the behavior of gamma rays inside an appropriate detecting material of detector 11 in which the gamma rays are Compton-scattered and deposit energy at locations within the material. These deposits of energy produce recoil electrons within the detecting material. According to one embodiment, detector 11 is constructed using a material that Compton-scatters incident gamma rays and generates scintillation light as the produced recoil electrons traverse the material and release energy gained from the Compton-scatterings. Sensor 12 records the recoil electron tracks by recording the locations and the intensities of the scintillation light generated by the recoil electrons within detector 11. One skilled in the art will recognize that other detection systems may be used without departing from the scope of the invention. For example, the detection system may be implemented using other mechanisms, such as a silicon strip detector or a multi-wire proportional chamber, that Compton-scatter incident gamma rays and allow the track of the produced recoil electrons to be detected.

Figure 2:
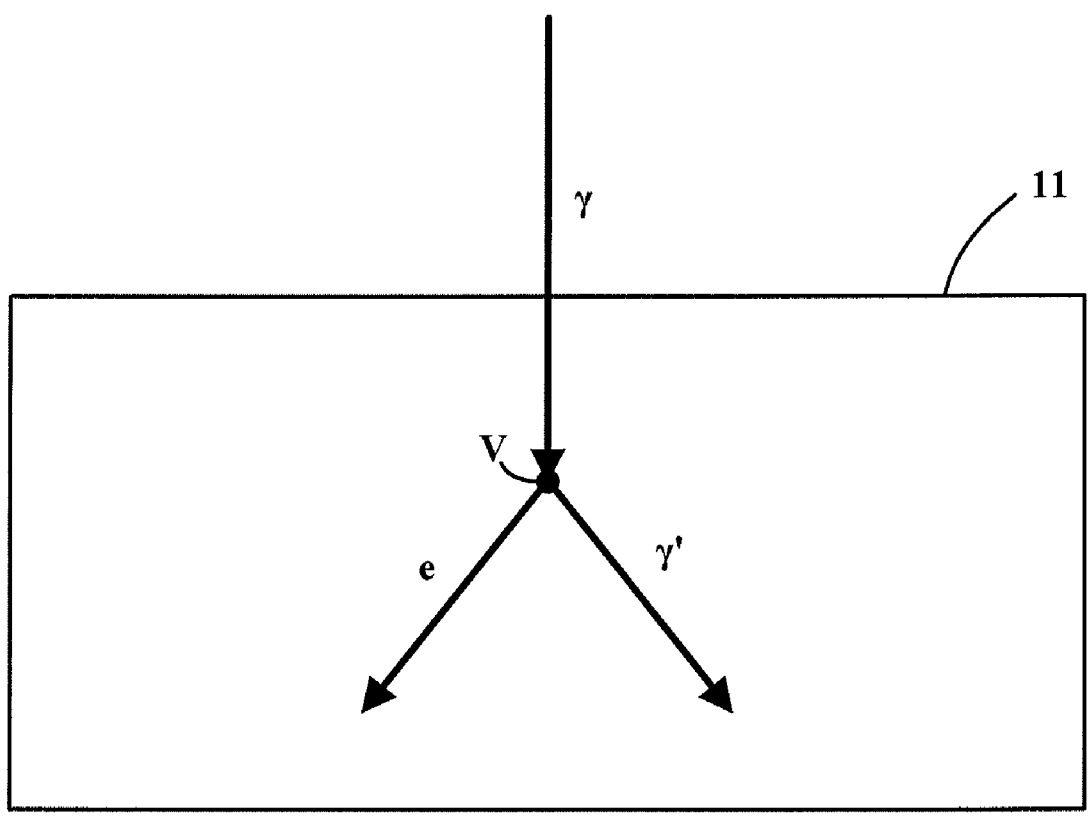
FIG. 2 is a diagram depicting the Compton-scattering of an incident gamma ray in a detecting material.

FIG. 2 is a diagram depicting the Compton-scattering of an incident gamma ray within a material of detector 11. As shown in FIG. 2, an incident gamma ray γ enters the detecting material of detector 11 and is Compton-scattered at a point V. As a result of the Compton-scattering, a recoil electron e and a Compton-scattered gamma ray γ' are produced. The recoil electron e traverses detector 11 releasing the energy gained from the Compton-scattering of incident gamma ray γ. Compton-scattered gamma ray γ' also traverses detector 11 and either exits detector 11, Compton-scatters within detector 11 or is absorbed by detector 11. Using the energies and directions of multiple recoil electrons produced by the Compton-scattering of multiple incident gamma rays, the energy spectrum and the direction to the source of the incident gamma rays are determined, as described in detail below.

Figure 3:
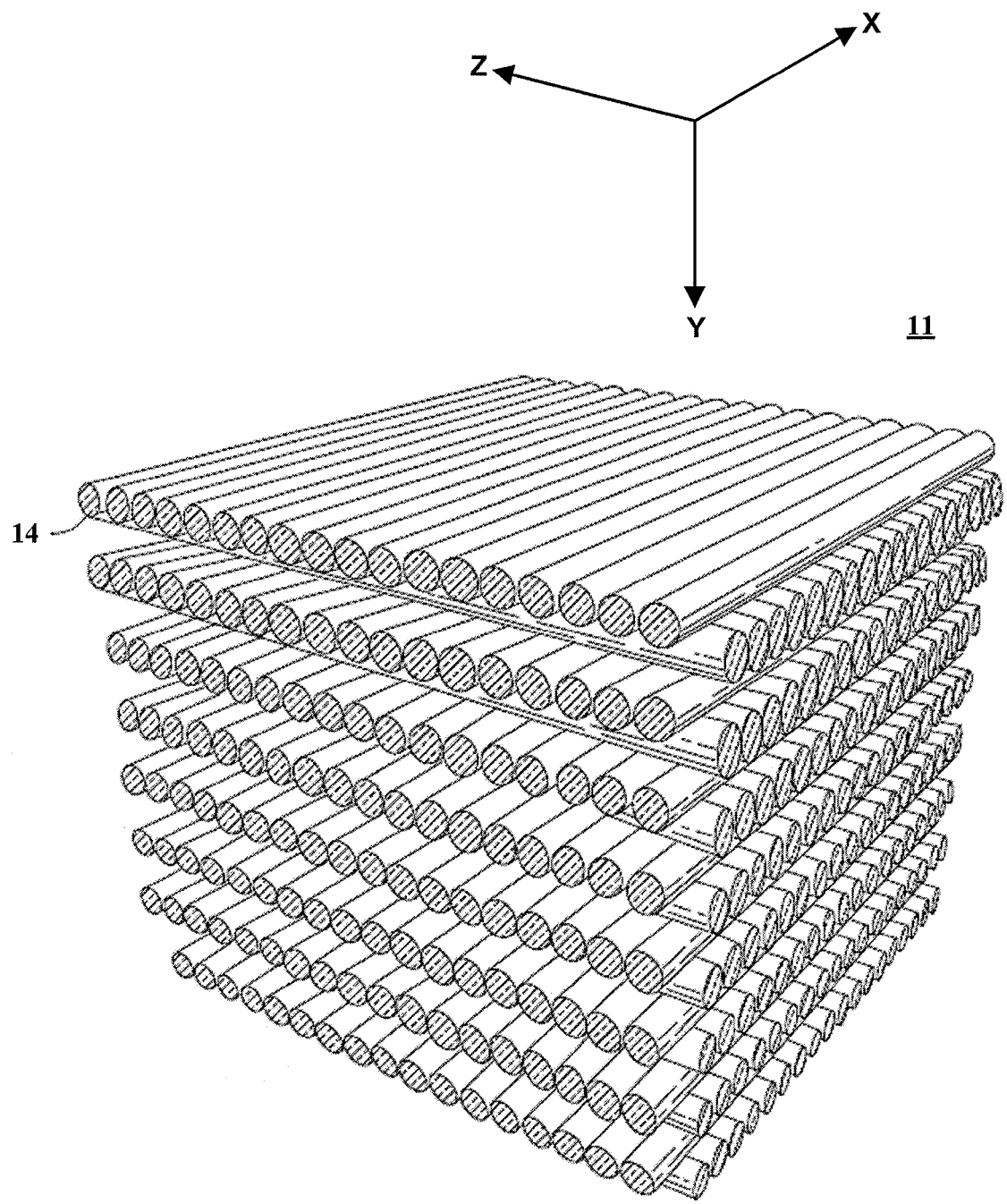
FIG. 3 is a drawing depicting a construction of a detector according to one embodiment of the invention.

FIG. 3 is a drawing depicting a construction of detector 11 according to one embodiment of the invention. In this example, detector 11 is constructed using multiple layers of fiber-optic scintillators 14 to form a block. The fiber-optic scintillators 14 used to form each layer are arranged parallel to each other in a plane and are oriented in a direction that is orthogonal to the direction of the fiber-optic scintillators 14 in adjacent layers. In this manner, half of the fiber-optic scintillators 14 used to form the block are parallel to the z-axis and terminate in the x-y plane, while the other half of the fiber-optic scintillators 14 are parallel to the x-axis and terminate in the y-z plane.

When a recoil electron traverses detector 11, the recoil electron loses energy which generates scintillation light in the traversed fiber-optic scintillators 14. A portion of this scintillation light is trapped and travels down the axis of the respective fiber-optic scintillators 14 where it can be detected at the end. By identifying which of the fiber-optic scintillators 14 produce scintillation light, the track of a recoil electron within detector 11, and hence the starting point and direction of the recoil electron, can be determined.

An advantage of the gamma vector camera over conventional gamma imaging systems is that the gamma vector camera can operate using a single type of detector material in detector 11. Many conventional systems rely on both the Compton-scattering of an incident gamma ray and the subsequent photo-absorption of the scattered gamma ray. Because materials suitable for photo-absorption typically have a much higher atomic number Z than those preferred for Compton-scattering, these system usually require two different types of materials to accommodate these two events. On the other hand, gamma vector camera 10 uses the Compton-scattering of incident gamma rays to determine the energy spectrum and the direction to the source of the gamma rays and therefore a single type of detection material may be used to construct detector 11.

As indicated above, the direction to a gamma ray source is determined using the directions of recoil electrons produced by the Compton-scattering of incident gamma rays emitted from the source. Electrons are deflected as they travel through a material, with the probability of a large-angle deflection per unit length traveled decreasing with the atomic number Z of the material. Accordingly, fiber-optic scintillators made of a material having a low atomic number Z are preferable for construction of detector 11. One such material suitable for fiber-optic scintillators 14 is polystyrene ($C_8H_8$) doped with scintillating compounds. Those skilled in the art will recognize other types of detection materials having appropriate properties that may be used in alternative embodiments of the invention.

The dimensions of detector 11 are selected based on system specifications such as an energy range of expected gamma rays. The energy range may be specified according to the types of gamma ray sources being monitored or sought. Using gamma rays within a specified energy range, the mean free paths of those gamma rays in the material of detector 11 may be used to determine the dimensions of detector 11.

As noted above, gamma vector camera 10 uses a single Compton-scattering of incident gamma rays to determine the energy spectrum and the direction to a gamma ray source. Because only a single Compton-scattering of each incident gamma rays is used, the dimensions of detector 11 can be smaller than that required for gamma ray imaging systems that require either multiple Compton-scatterings or a combination of Compton-scatterings and photo-absorption of incident gamma rays. According to one embodiment of the invention, each of the dimensions of detector 11, such as length, width and height, is selected to be less than or equal to the longest mean free path of gamma rays in the specified energy range. It is to be understood, however, that the invention is not limited to this size and may be implemented using a detector having one or more dimensions that exceed the longest mean free path of gamma rays having energies in the specified range.

The range of recoil electrons is another factor that may be used to determine the dimensions of detector 11. Starting with the specified energy range of gamma rays discussed above, an energy range of recoil electrons produced by the Compton-scattering of the gamma rays is identified. The spectrum of recoil electron energies may be determined using a simulation such as a Monte Carlo simulation of Compton-scatterings of the gamma rays. Using the spectrum of the recoil electron energies together with the material properties of detector 11, the distance or range that the recoil electrons are able to traverse in detector 11 is determined.

As will be described in more detail below, the scintillation light generated through the track of a recoil electron in detector 11 is used to determine the energy of the recoil electron. The dimensions of detector 11 are selected to allow the full track of the recoil electron to be contained within detector 11. According to one embodiment of the invention, each dimension of detector 11, such as length, height and width, is selected to be between two and four times the longest range of recoil electrons generated by gamma rays within the specified energy range. It is to be understood that the invention is not limited to this size and may be implemented using a detector 11 having one or more dimensions that exceed this size.

In order to determine the location of a recoil electron track within detector 11, the recoil electron should travel through at least two layers of detector 11. When scintillation light is produced in fiber-optic scintillators 14 in at least two layers of detector 11, the locations of those fiber-optic scintillators are combined to determine a three-dimensional location of the electron track within detector 11. Accordingly, the width or diameter of each of the fiber-optic scintillators 14 should be smaller than the range of recoil electrons in the fiber-optic material. Taking into account that recoil electrons often travel at an angle relative to the axis of the fiber-optic scintillators 14, the width or diameter of each of the fiber-optic scintillators 14 should be a fraction of the range of the recoil electrons. For example, a recoil electron having an energy of 100 keV has a range of approximately 140 μm in polystyrene. Based on this range, the width or diameter of the fiber-optic scintillators 14 is selected to be no larger than 50 μm and preferably 25 μm or less. These widths are intended only as examples. Alternative embodiments of the invention may use other fractions of the recoil electron range for the width or diameter of the fiber-optic scintillators 14 without departing from the scope of the invention.

Figure 4:
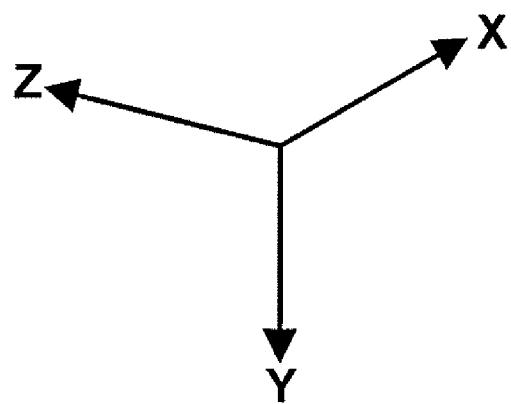
FIG. 4 is a diagram depicting a configuration of the detector and sensors of a gamma vector camera according to one embodiment of the invention.
Figure 4:
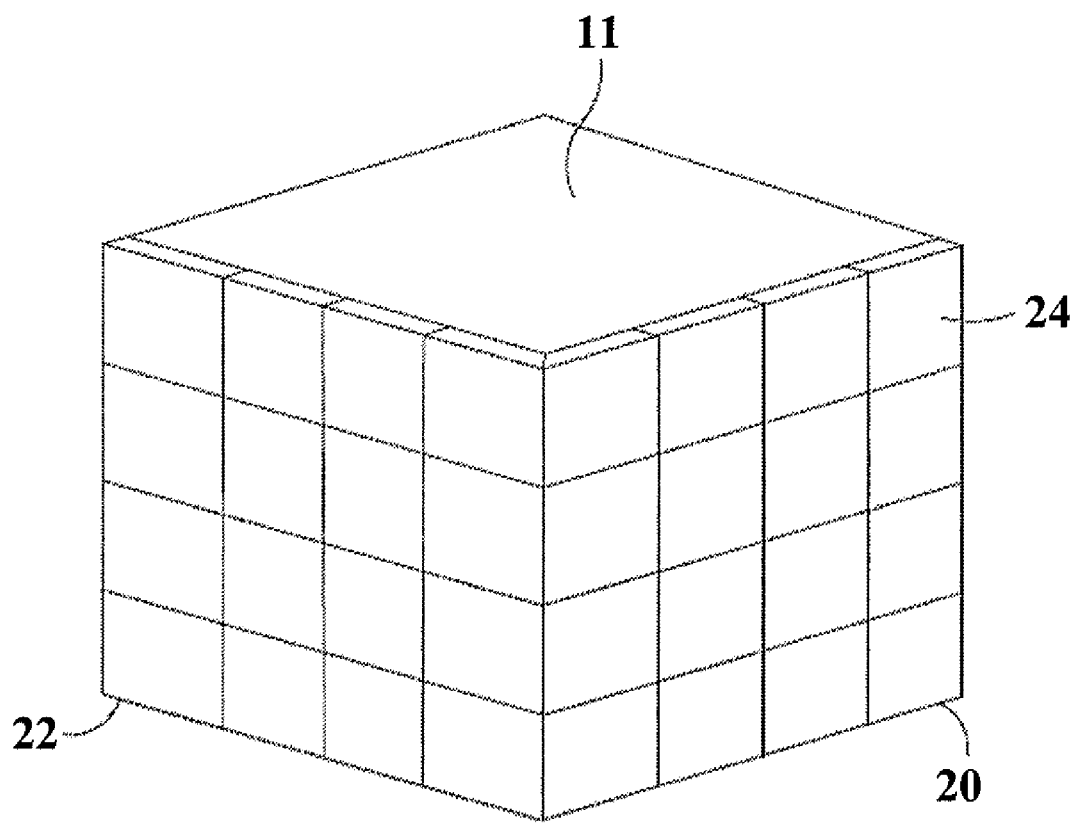

As mentioned above, the location of a recoil electron track is determined based on the fiber-optic scintillators 14 that produce scintillation light in detector 11. To detect this scintillation light, a pair of photo sensor arrays is positioned adjacent to detector 11. When detector 11 is arranged as depicted in FIG. 4, an x-y photo sensor array 20 is positioned adjacent to the ends of the fiber-optic scintillators 14 arranged parallel to the z-axis and a y-z photo sensor array 22 is positioned adjacent to the ends of the fiber optic scintillators 14 arranged parallel to the x-axis. Constructing detector 11 and sensor 12 in this manner provides a gamma ray detector having a spherical field of view with nearly uniform sensitivity.

Each of photo sensor arrays 20 and 22 comprises multiple pixel elements 24 arranged to correspond with the ends of the fiber-optic scintillators 14 adjacent to the respective photo sensor array. Pixel elements 24 can be arranged in a one-to-one correspondence with the adjacent fiber-optic scintillators 14. Alternatively, more than one pixel element 24 can be arranged in correspondence with each of the adjacent fiber-optic scintillators 14. The pixel elements 24 record the light intensity of the scintillation light produced by the adjacent fiber-optic scintillators 14.

Photo sensor arrays 20 and 22 may be implemented using charge-coupled devices (CCDs) having a resolution sufficient for the number of fiber-optic scintillators 14 in detector 11. CCDs are readily available at relatively low cost and therefore provide a cost-effective implementation of photo sensor arrays 20 and 22. Alternatively, each of the photo sensor arrays 20 and 22 may be implemented using a linear photodiode array, a linear phototransistor array, a Darlington avalanche photodiode array, a CMOS array, a microchannel plate, or position-sensitive photomultiplier tubes.

As incident gamma rays interact with detector 11, Compton-scattering events are recorded using photo sensor arrays 20 and 22. Specifically, when an incident gamma ray interacts with detector 11 producing a recoil electron, the event is recorded by reading the respective light intensities of the scintillation light recorded by pixel elements 24 in photo sensor arrays 20 and 22 and storing the light intensities together with the coordinates of the respective pixel elements 24 in an event list. For each event, an x-y event list is created containing data entries of the (x,y) coordinates of the pixel elements 24 that recorded scintillation light in the x-y photo sensor 20 together with the associated recorded light intensity, and a y-z event list is created containing data entries of the (y,z) coordinates of the pixel elements 24 that recorded scintillation light in the y-z photo sensor 22 together with the associated recorded light intensity. Also included in the data entries is time the light intensity was recorded.

The timing for recording Compton-scattering events may be implemented using any of a number of techniques. For example, photo sensor arrays 20 and 22 may be read and processed at a regular interval, such as at a rate of 100 frames per second. The number of recorded frames per second may be varied based on the specifications of different implementations of the gamma vector camera. Alternatively, photo sensor arrays 20 and 22 may be read and processed using a triggering implementation.

Figure 5:
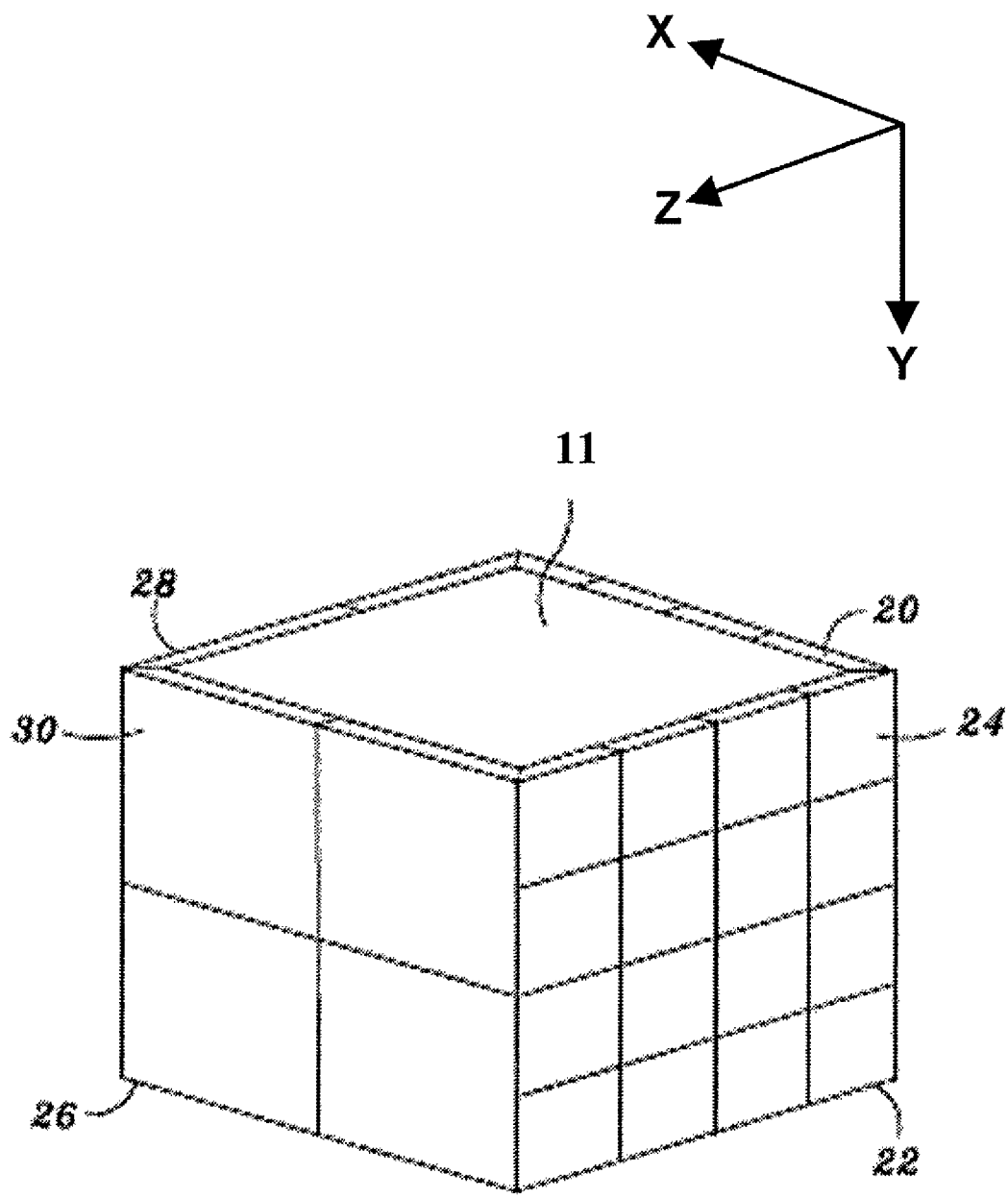
FIG. 5 is a diagram depicting a configuration of the detector and sensors of a gamma vector camera according to one embodiment of the invention.

According to one embodiment of the invention, an array of diode triggers for each of photo sensors arrays 20 and 22 are used to trigger the reading and processing of a portion of the pixel elements 24 in photo sensors arrays 20 and 22. FIG. 5 depicts the construction of detector 11 and sensor 12 using this alternative embodiment. As shown in FIG. 5, fast sensor arrays 26 and 28, which are comprised of diode triggers 30, are arranged at opposite ends of the fiber-optic scintillators 14 from x-y photo sensor array 20 and y-z photo sensor array 22. Each of diode triggers 30 corresponds to a number of pixel elements 24 in the corresponding photo sensor array. For example, FIG. 5 shows a ratio of one diode trigger 30 for every four pixel elements 24. When one of diode triggers 30 detects scintillation light at the end of one or more fiber-optic scintillators 14, the pixel elements 24 corresponding to the particular diode trigger 30 are read and recorded. In this manner, only those pixel elements 24 that are in the area where scintillation light has been generated are recorded. By matching the times when diode triggers 30 detect scintillation light and cause a portion of pixel elements 24 to be read, detected scintillation light associated with the same event is matched. The numbers of pixel elements 24 and diode triggers 30 depicted in FIGS. 4 and 5 are for description purposes only. Using the preferred dimension of detector 11 and the preferred diameter of fiber-optic scintillators 14, one skilled in the art will recognize that the actual numbers of these elements will exceed the numbers depicted in these figures.

In an alternative embodiment, image intensifiers are arranged between the detector 11 and each of photo sensor arrays 20 and 22. A control system is used to monitor for the coincident amplification of light by both image intensifiers as an indicator of a Compton-scattering event within detector 11. Upon detecting coincident amplification, photo sensor arrays 20 and 22 are read and processed to record the event. Such a scintillation event capture system is described in U.S. patent application Ser. No. 11/595,567, which was filed on Nov. 10, 2006, and is hereby incorporated by reference.

Noise reduction techniques may be employed to distinguish scintillation light from noise in photo sensor arrays 20 and 22. For example, known noise reduction algorithms may be used to remove a noise component from the intensity recorded by pixel elements 24. Alternatively, additional pixel elements 24 that do not correspond to any of fiber-optic scintillators 14 may be used in real time to record any noise in the system, which is then removed from the intensities recorded by pixel elements 24 that do correspond to fiber-optic scintillators 14. One skilled in the art will recognize that other noise reduction algorithms and systems may be employed within the scope of the present invention.

Figure 6:
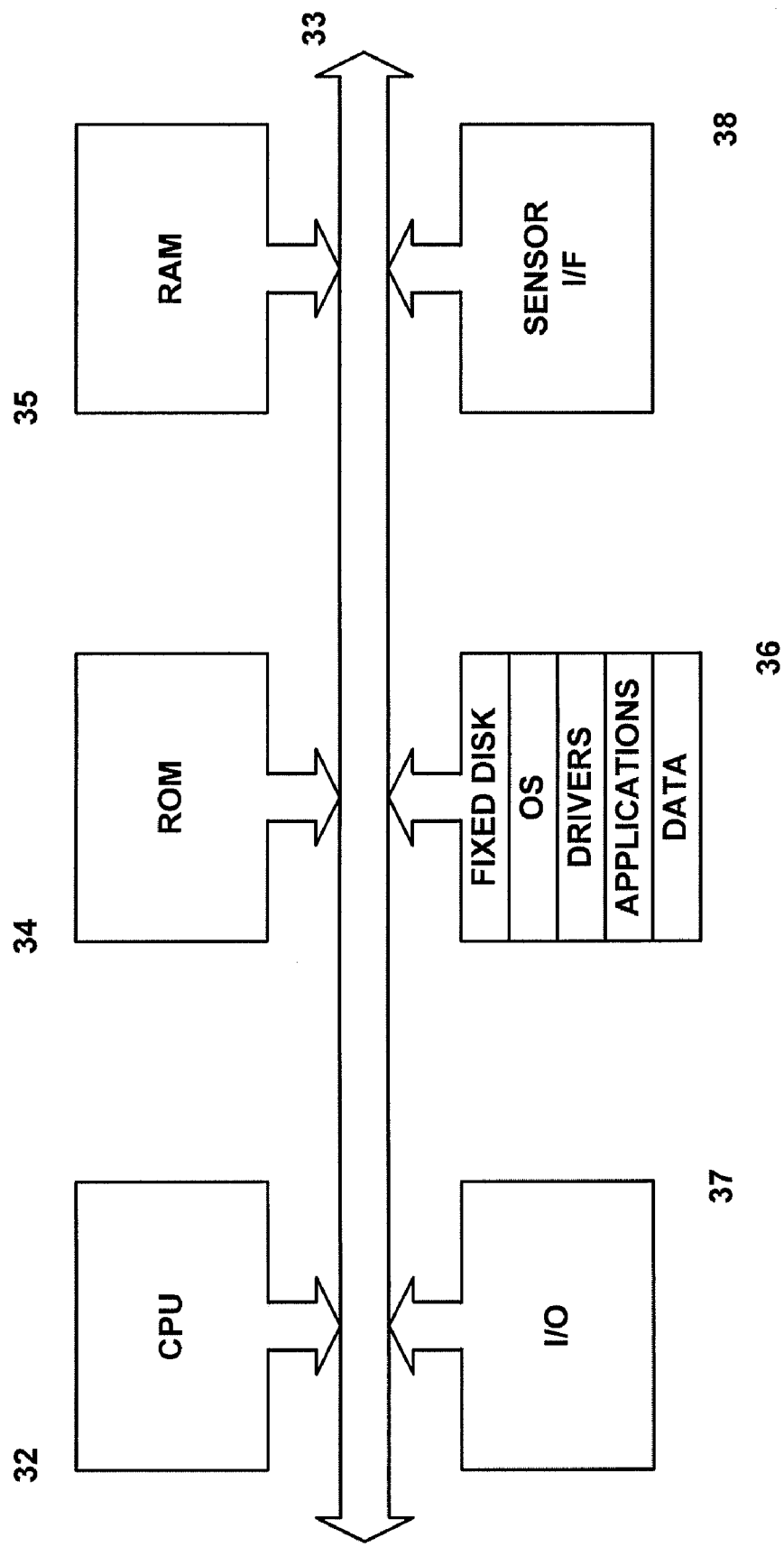
FIG. 6 is a block diagram depicting components of a processor of a gamma vector camera according to one embodiment of the invention.

FIG. 6 is a block diagram depicting the basic components of processor 13 according to one embodiment. In particular, processor 13 comprises a central processing unit such as a programmable microprocessor (CPU) 32 that is interfaced to a bus 33. Also interfaced to bus 33 are read-only memory (ROM) 34, random-access memory (RAM) 35, fixed disk 36, I/O interface 37 and sensor interface 38.

CPU 32 executes program instructions sequences that have been loaded into RAM 35, which acts as a main run-time memory for CPU 32. The program instructions sequences are loaded into RAM 35 by CPU 32 from fixed disk 36 or some other computer-readable memory medium such as CD or DVD media. Fixed disk 36 stores program instruction sequences of multiple software modules. The software modules stored in fixed disk 36 include, but are not limited to, an operating system for managing the software applications and resources of processor 13; drivers for controlling and communicating with peripheral devices attached to processor 13 via I/O interface 37 and sensor I/F 38; application modules for performing the processes used to implement the present invention, which are described in detail below; and data such as event lists and data representing the energy and direction of incident gamma rays reconstructed according to the present invention. ROM 34 stores invariant instruction sequences to be executed by CPU 32, such as start-up instruction sequences and basic input/output system (BIOS) instruction sequences, for the operation of certain peripheral devices attached to processor 13. I/O interface 37 provides an interface to processor 13 for input-output devices such as a keyboard, pointing device, monitor, printer, etc. Sensor interface 38 provides an interface between processor 13 and the photo sensor arrays of sensor 12.

Processor 13 can be implemented using a general purpose computer such as a PC-compatible computer or laptop to which sensor 12 is interfaced. In addition, the internal components of processor 13 described above can be incorporated into a single apparatus together with detector 11 and sensor 12. Alternatively, processor 13 and the processes associated with the present invention may be implemented completely in hardware using logical circuits such as gate arrays.

Figure 7:
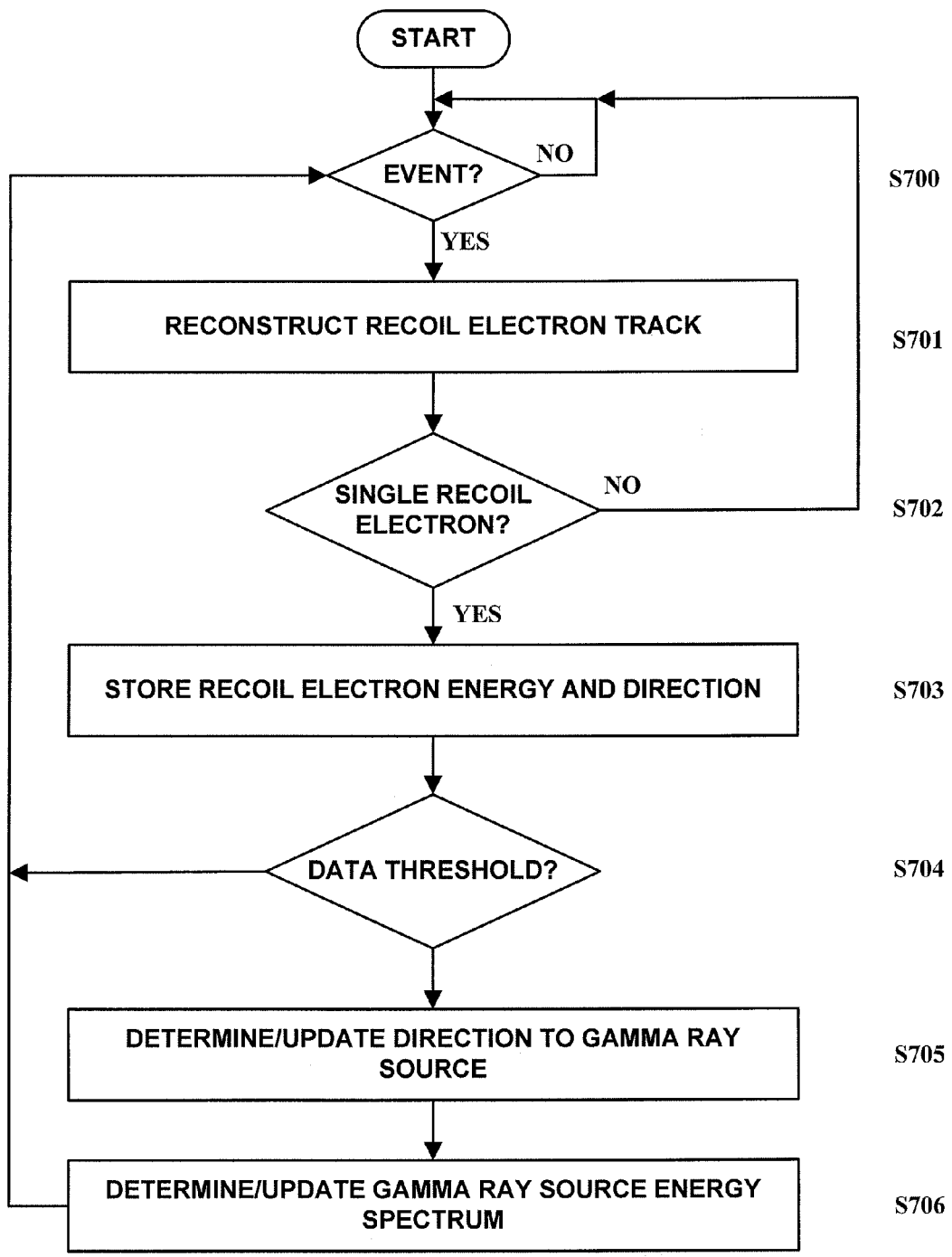
FIG. 7 is a flowchart depicting an operating process of a gamma vector camera according to one embodiment of the invention.

FIG. 7 is a flowchart depicting an operating process of gamma vector camera 10 according to one embodiment of the invention. As shown in FIG. 7, gamma vector camera 10 waits for a Compton-scattering event in step S700. The occurrence of a Compton-scattering event may be determined based on a triggering mechanism or at a regular interval, as described above. Upon the occurrence of a Compton-scattering event, the track of the produced recoil electron is reconstructed by determining the energy and the direction of the recoil electron in step S701. If more than one recoil electron was recorded for the Compton-scattering event, the operating process returns to step S700 to await the next Compton-scattering event. If only one recoil electron was recorded for the Compton-scattering event (step S702), the energy and the direction of the recoil electron are stored for further processing (step S703). In step S704, it is determined whether the number of recoil electrons (energy and direction) stored exceeds a data threshold. If the data threshold has not been exceeded, processing returns to step S700 to await the next Compton-scattering event. If the data threshold has been exceeded, the direction to the gamma ray source is determined/updated in step S705 and the energy spectrum of the gamma ray source is determined/updated in step S706. The operating process then returns to step S700 to await the next Compton-scattering event. This operating process is initiated by a user selecting and executing an instruction sequence in processor 13. The process continues until stopped by the user. The operating process will now be described in more detail.

The occurrence of a Compton-scattering event results in the creation of an x-y event list and a y-z event list. As describe above, these event lists may be generated at regular intervals or in response to a trigger. The operating process remains in a hold state in step S700 until an x-y event list and a y-z event list are ready for further processing.

Once an x-y event list and a y-z event list are ready for processing, the operating process proceeds to step S701 where the recoil electron track is reconstructed. Reconstruction of the recoil electron track involves a process for determining the direction and the energy of the recoil electron. First, the data entries in each event list are sorted and isolated into lists for individual recoil electron tracks. Second, using the data entries for each recoil electron track, the recoil electron track is reconstructed by determining the starting point, direction and energy of the recoil electron associated with the recoil electron track. These processes are described in more detail below.

Figure 8:
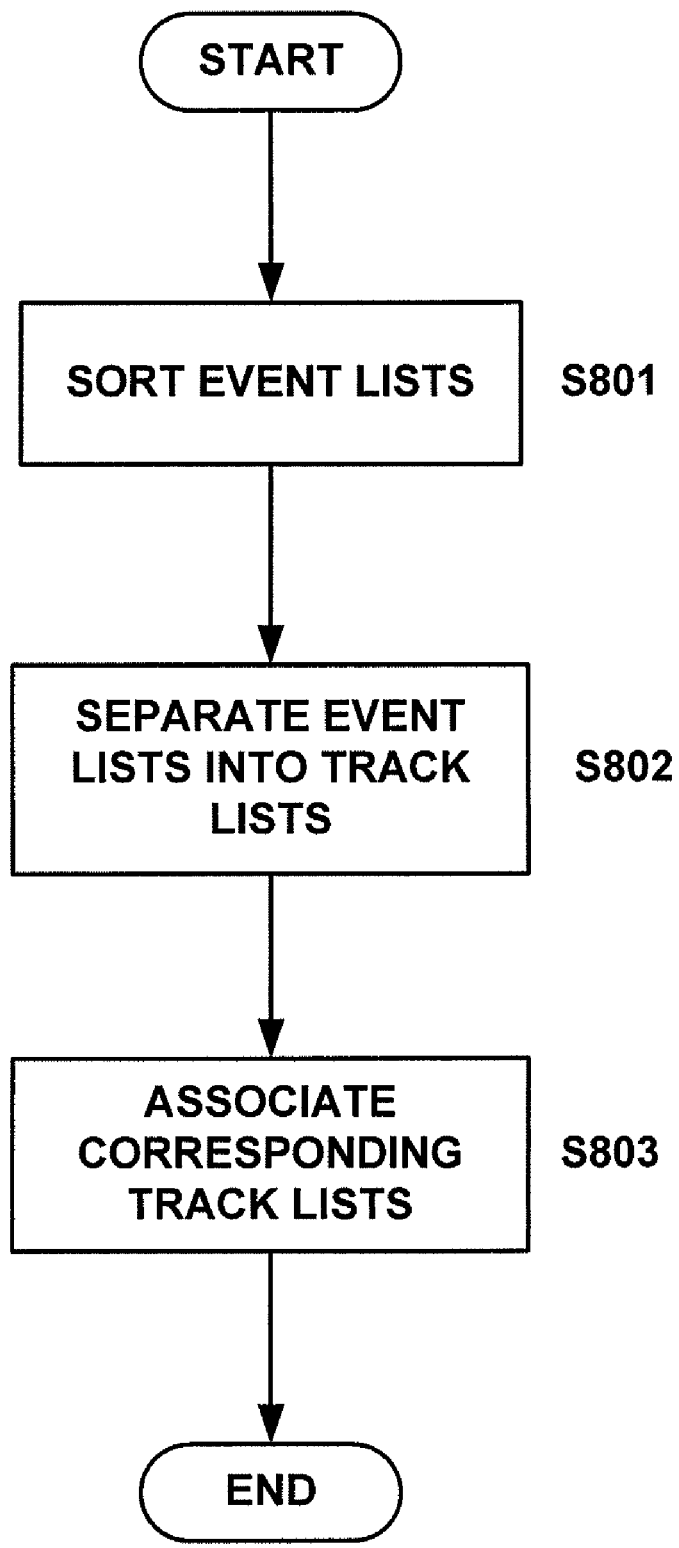
FIG. 8 is a flowchart depicting a process for sorting the event lists into track lists for respective recoil electron tracks according to one embodiment of the invention.

FIG. 8 is a flowchart depicting a process for sorting the event lists into track lists for respective recoil electron tracks. As described above, the event lists include an x-y event list of coordinates and associated light yields from the x-y photo sensor array and a y-z event list of coordinates and associated light yields from the y-z photo sensor array. The process comprises sorting the data entries in the event lists (Step S801), separating the sorted data entries into track lists (Step S802), and associating corresponding track lists (Step S803).

In step S801, each of the event lists is sorted using the coordinate dimension having the largest spread. Specifically, the x-y event list is sorted by determining which coordinate, either x or y, has the largest spread in the data entries of the event list and sorting the data entries from lowest to highest value of the sorting coordinate. The y-z event list is sorted by either the y or z coordinate in the same manner.

Figure 9:
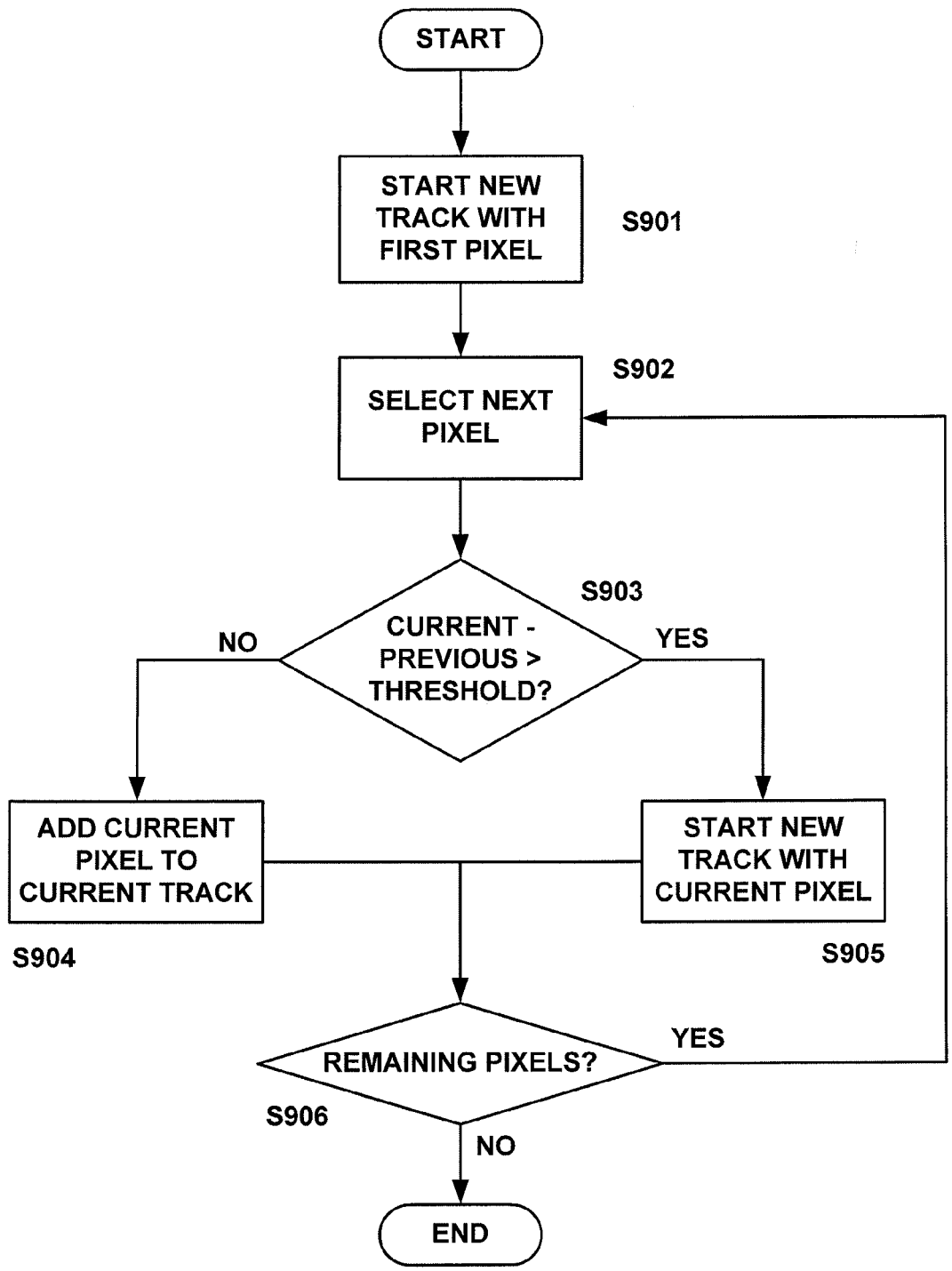
FIG. 9 is a flowchart depicting a process for separating the data entries into individual track lists according to one embodiment of the invention.

In step S802, the data entries of the sorted event lists are separated into individual track lists, where each track list corresponds to the track of a recoil electron. FIG. 9 is a flowchart depicting a process for separating the data entries into individual track lists. In step S901, a track list is created using the first data entry in the event list. The next data entry in the event list is selected in step S902 and compared to the previous entry using the sorting coordinate in step S903. If the sorting coordinate value of the current data entry does not exceed that of the previous data entry by a threshold value, the current data entry is assumed to be part of the current recoil electron track and is added to the current track list in step S904. Alternatively, if the sorting coordinate of the current data entry exceeds that of the previous data entry by the threshold value, the current data entry is assumed to be too far apart from the previous entry to be part of the same recoil electron track and a new track list is created using the current data entry as the initial entry in step S905.

The threshold value used in the process described above is set based on the probable separation of recoil electrons produced by a scattered gamma ray. Specifically, if two data entries are separated by less than a certain percentage of the mean free path of a gamma ray, then the two data entries are assumed to be the result of the same recoil electron and not two different recoil electrons. According to one embodiment, 600 μm, which is 1% of the mean free path of a 100 keV recoil electron, was used to establish the threshold value. The threshold value is determined by dividing this distance by the width or diameter of the fiber-optic scintillators 14.

In step S906, it is determined whether another data entry exists in the current event list. If another data entry exists, the process returns to step S902 and the process is repeated. This cycle repeats until the entire event list has been traversed and sorted into individual track lists. This process is performed for both the x-y event list and the y-z event list of each recorded event.

Figure 10:
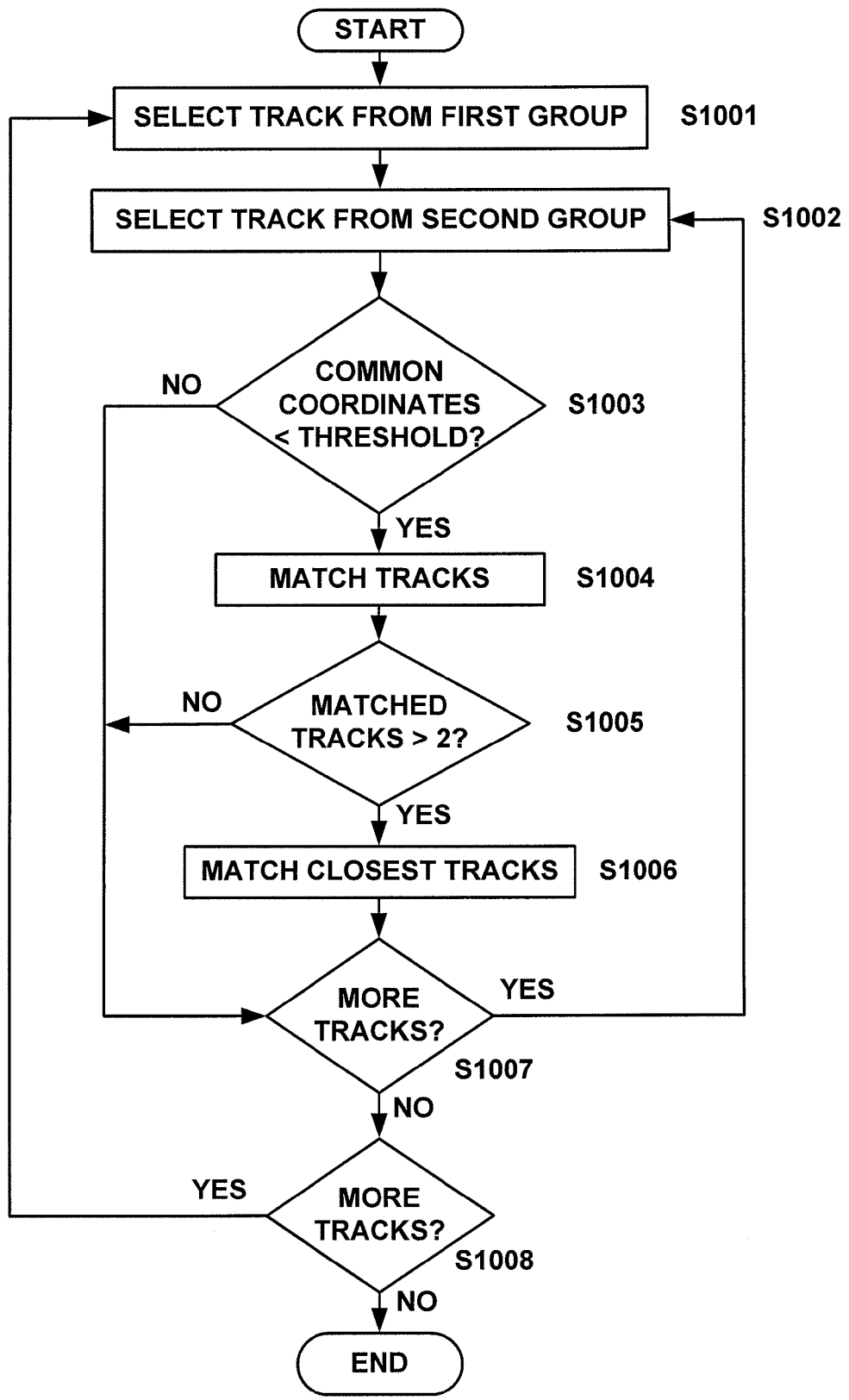
FIG. 10 is a flowchart depicting a process for matching the corresponding track lists according to one embodiment of the invention.

Returning to FIG. 8, the individual track lists from the x-y event list are matched with their corresponding track lists from the y-z event list in step S803. FIG. 10 is a flowchart depicting a process for matching the corresponding track lists. The process begins by selecting the first track list from the x-y event list in step S1001 and the first track list from the y-z event list in step S1002. The two selected track lists are then compared using their common coordinate, the y coordinate for this embodiment, in step S1003. To compare the two selected track lists, the maximum and minimum values for the common coordinate are compared. If the maximum and minimum common coordinate values of the compared track lists differ from each other by less than a set threshold, the track lists are matched as corresponding track lists in step S1004. For the comparison in step S1003, it is assumed that a recoil electron is not likely to skip multiple layers in detector 11. Accordingly, in one embodiment of the invention, the threshold is set at four pixels. It is to be understood, however, that other threshold values may be utilized.

To confirm that only one track list from each of the x-y event list and the y-z event list are matched together for a particular recoil electron, it is determined in step S1004 if more than two track lists are matched as corresponding track lists. If more than two track lists are currently matched, the track lists from each of the x-y event list and the y-z event list that are closest to each other with respect to the maximum and minimum y values are matched as the corresponding track lists in step S1006.

If it is determined in step S1005 that only two track lists are currently matched, or if it is determined in step S1003 that the maximum and minimum values of the common coordinate of the selected track lists differ by more than the set threshold, it is determined in step S1007 if additional track lists remain in the y-z event list. If additional track lists remain, the process returns to step S1002 and the next track list in the y-z event list is selected. If no more track lists remain in the y-z event list, the process proceeds to step S1008 where it is determined whether additional track lists remain in the x-y event list. If additional track lists remain, the process returns to step S1001 and the next track list in the x-y event list is selected. If no more track lists remain in either event list, the process ends. In the foregoing manner, each of the track lists from the x-y event list is compared with each of the track lists from the y-z event list to determine and match corresponding track lists.

Figure 11:
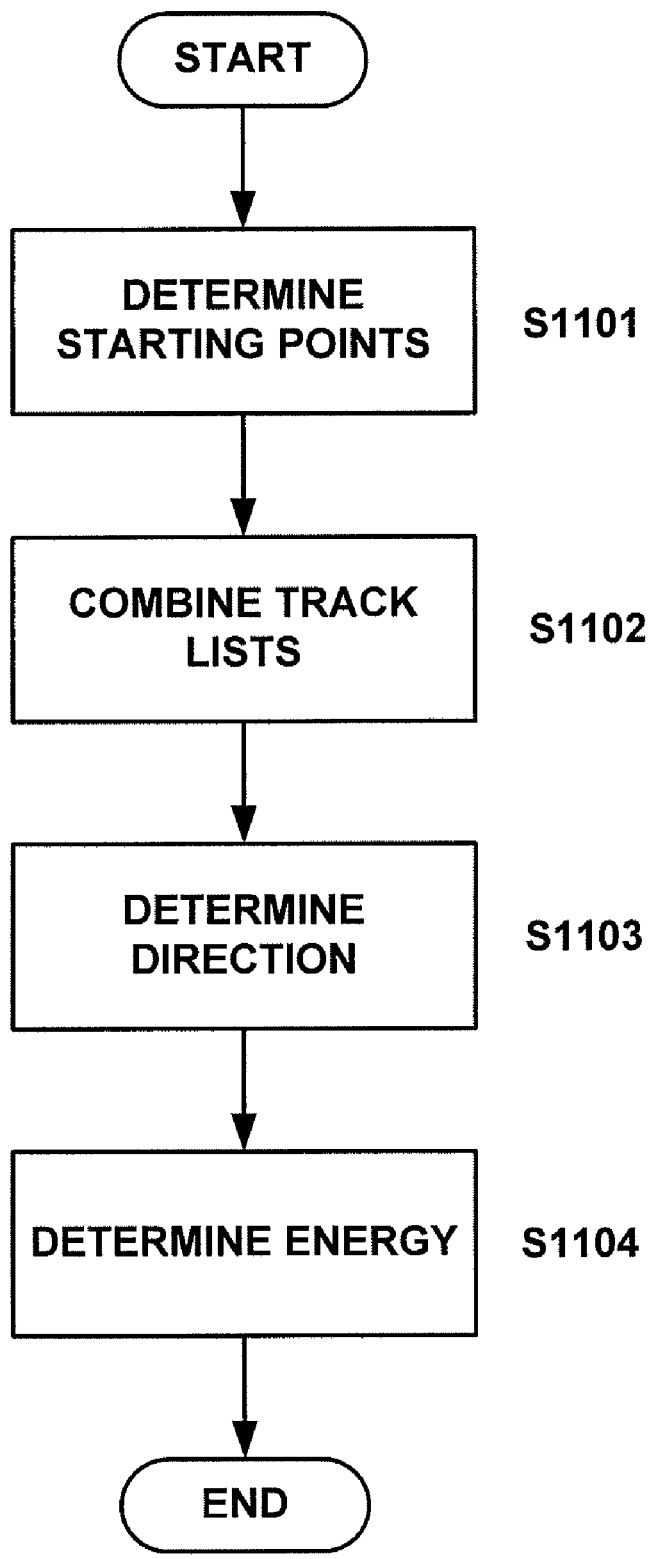
FIG. 11 is a flowchart depicting a process for reconstructing the recoil electron track for each pair of corresponding track lists according to one embodiment of the invention.

A recoil electron track is reconstructed by defining its starting point, its initial direction and the energy of the recoil electron. FIG. 11 is a flowchart depicting a process for reconstructing the recoil electron track for each pair of corresponding track lists matched in the processes described above. To reconstruct a recoil electron track, a starting point for each of the individual track lists is determined (Step S1101), the corresponding track lists are combined (Step S1102), the original direction of the reconstructed track is determined (Step S1103), and the energy of the recoil electron is determined (Step S1104). Each of these process steps is described in more detail below.

Figure 12:
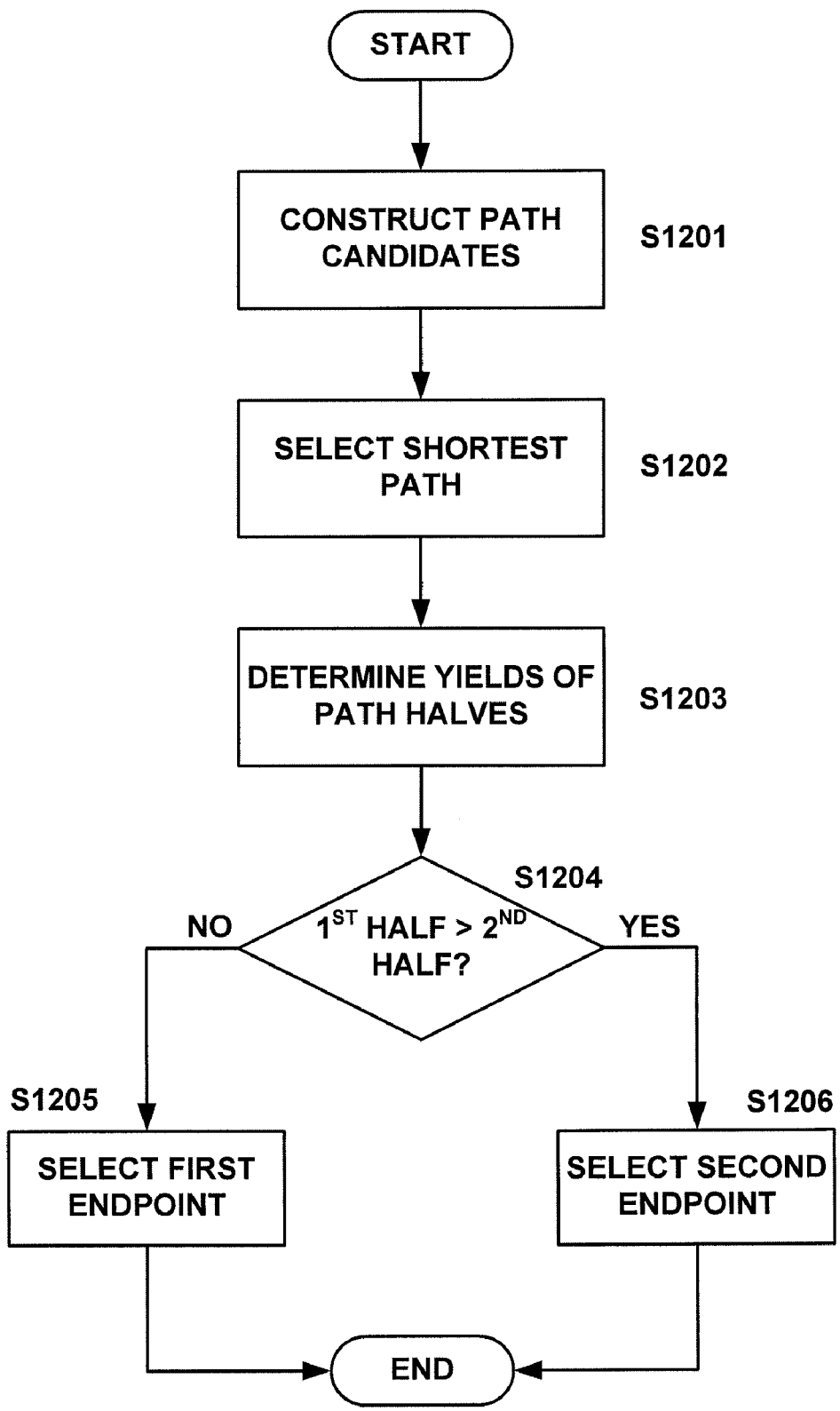
FIG. 12 is a flowchart depicting a process for determining the starting point within a track list according to one embodiment of the invention.

To reconstruct a recoil electron track from the corresponding track lists, a starting point for traversing the data entries in the track lists must be determined. FIG. 12 is a flowchart depicting a process for determining the starting point within a track list. In step S1201, candidate paths are constructed as possible tracks. For the majority of electron tracks, the starting point is at an extremum in the direction of one of the coordinates in the track list. Therefore, four candidate paths for each track list are constructed using the data entries having coordinates with the minimum and maximum x and y values for the track lists from the x-y event list as starting points, and data entries having coordinates with the minimum and maximum y and z values from the y-z event list as starting points. The candidate paths are constructed by starting at each of the starting points and moving to the nearest unvisited data entry until all data entries in the track list have been included in the path. The candidate path that has the shortest overall length is then selected in step S1202.

Over the energy range of a few hundred keV, recoil electron energy loss per unit length traveled increases as the recoil electron energy decreases. Therefore, the starting point of an electron track should have a smaller light yield per unit length traversed than the end of the electron track. In step S1203, the path selected in step S1202 is divided in half and the light yield for each half is determined using the sum of the light intensity yields from the data entries in the track list. Alternatively, the light yield for each half could be computed per unit length traveled. The light yield for the first half of the selected candidate path and the second half of the candidate path are compared in step S1204. If the light yield for the first half of the path is smaller than that of the second half, the endpoint in the first half is selected as the starting point in step S1205. If the light yield for the first half of the path is larger than that for the second half of the path, the endpoint in the second half is selected as the starting point in step S1206.

Figure 13:
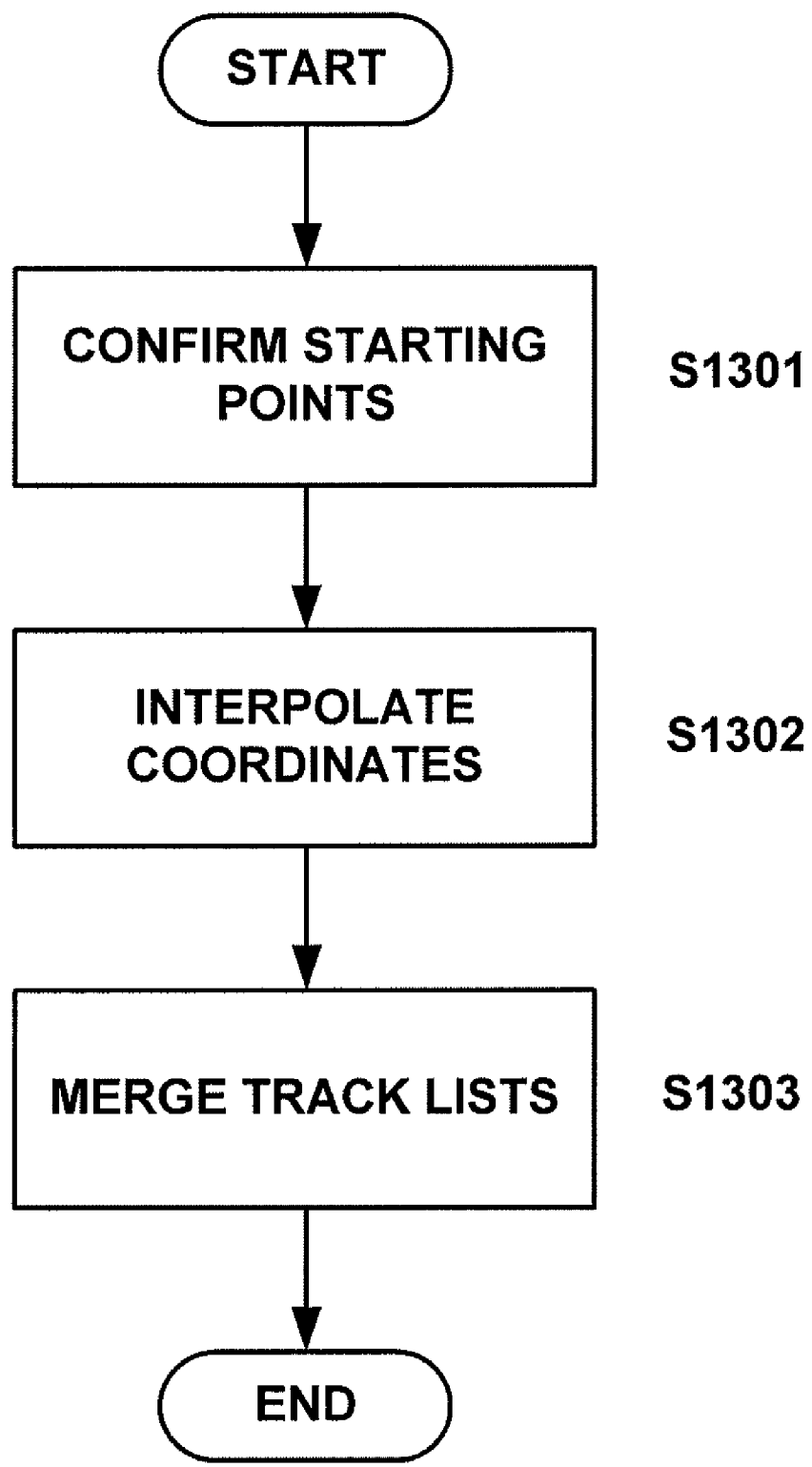
FIG. 13 is a flowchart depicting a process for combining the track lists from the x-y event list with the corresponding track lists from the y-z event list according to one embodiment of the invention.

Once the starting points for the track lists in the x-y event list and the track lists in the y-z event list have been determined, the (x,y) coordinate data entries from the x-y event list are combined with the (y,z) coordinate entries from the y-z event list to form a single track list having (x,y,z) coordinates. FIG. 13 is a flowchart depicting a process for combining the track lists from the x-y event list with the corresponding track lists from the y-z event list.

Before combining the corresponding track lists, the starting points for the corresponding track lists are checked in step S1301 to see if they match. To confirm that the starting points match, the values for the common coordinates are compared. If the common coordinates in the two starting points are close to each other within a threshold such as three coordinate values, the starting points of the tracks are confirmed. If the common coordinates of the two starting points are separated from each by more than the threshold, the total light yield of the first halves of the two tracks is compared with the total light yield of the second halves of the tracks, and the endpoints of the halves having the lowest light yield are set as the starting points.

In step S1302, the missing coordinate in each of the data entries in the track lists is interpolated. Specifically, for each data entry in the x-y track list, the missing z coordinate value is interpolated using the z coordinate values from data entries in the associated y-z track list having y coordinate values near the y coordinate value of the data entry being interpolated. For each data entry in the y-z track list, the x coordinate value is interpolated using the x coordinate values from data entries in the associated x-y track list having y coordinate values near the y coordinate value of the data entry being interpolated. The two track lists, now having x, y and z coordinate values, are then merged using the order of the data entries based on their coordinates into a single track list in step S1303.

Returning to FIG. 11, once a single track list has been generated from the x-y track list and the y-z track list, the direction of initial travel for the recoil electron track is determined in step S1103. This determination is made using a linear least squares fit in the following manner.

For a particle traveling in a straight line with constant velocity u and starting at a point $r_0$, the position r at a time t is given by equation (1).

$$r = r_0 + ut \quad (1)$$

The vector u (or a vector proportional to u) is obtained by minimizing $\chi^2$ in equation (2) with respect to u, with $r_i$ being the $i^{th}$ point on the track list.

$$\chi^2 = \sum_i |r_i - (r_0 + ut_i)|^2 \quad (2)$$

With $t_i$ taken to be proportional to i, the minimization of $\chi^2$ produces u as shown in equation (3).

$$u = \frac{\sum_{i=1}^{N}(r_i - r_0)i}{\sum_{i=1}^{N} i^2} \quad (3)$$

In equation (3), satisfactory results are obtained when N is set to either a fixed number of 10 or 5+20% of the total number of data entries in the combined track list. The u obtained using equation (3) is then converted into a unit vector by dividing by its length, where the direction of u is determined to be the initial direction of the recoil electron. The uncertainty in each component of u is determined using straightforward error propagation from equation (3), assuming that the uncertainty in each measured coordinate is about half of the diameter of one fiber-optic scintillator 18.

Once the starting point and direction of a recoil electron track are determined, the energy of the recoil electron for the track is calculated in step S1104. Prior to calculating the energy of a recoil electron, an energy calibration of detector 11 is performed to determine the average light yield per keV of electron energy. Using this ratio, the energy of a recoil electron is determined using the total amount of light recorded for the associated recoil electron track, which is obtained by adding the recorded light intensity yields for each of the data entries in the recoil electron track. The uncertainty in the energy of the recoil electron is computed assuming a Poisson distribution for the number of optical photons, which is determined based on the light intensity recorded by the photo sensor arrays, where the error in the number of optical photons is taken as the square root of the recorded number of photons.

Energy calibration can be performed either using simulation techniques or through actual testing of detector 11. Under the simulation approach, a distribution of light yields for a series of electron energies is generated using a Monte Carlo simulation. Using a Gaussian fit for the histogram of the distribution of light yields, a centroid for each peak in the distribution is determined and a linear least squares fit of the electron energy versus the respective centroids provides the average light yield for the respective electron energies.

One approach for performing energy calibration of the present invention through actual testing is to scatter gamma rays having a known energy from detector 11 and detect the resulting scattered gamma ray using a high-resolution detector such as a Ge crystal. Assuming a full photo peak event in the Ge detector, the energy of the recoil electron scattered in detector 11 is calculated as the known energy of the incident gamma ray less the energy detected by the Ge detector. Comparing this energy to the amount of scintillation light produced by detector 11 provides the average light yield.

In the foregoing manner, the recoil electron tracks for an event are reconstructed and defined by the energy of the recoil electrons, the starting points of the recoil electrons, the initial directions of the recoil electrons, and the uncertainties in the energy and direction of the recoil electrons.

Returning to FIG. 7, the recoil electron tracks reconstructed in step S701 are reviewed in step S702 to determine if more than one recoil electron was recorded for the Compton-scattering event. As indicated above, gamma vector camera 10 uses the single Compton-scatterings of incident gamma rays to determine the energy and the direction of the gamma ray source. If an incident gamma ray is Compton-scattered more than once in detector 11 so that multiple recoil electron tracks are reconstructed for an event, the reconstructed recoil electron tracks are not used to determine the energy spectrum and the direction to the gamma ray source and the process returns to step S700 to await the next Compton-scattering event. The data associated with the multiple reconstructed recoil electron tracks may be discarded by processor 13. Alternatively, the data may be processed using a different process that relies on multiple Compton-scatterings of an incident recoil electron to determine the energy and the direction of the incident gamma ray. Such a process is described in parent U.S. application Ser. No. 10/866,760. If it is determined in step S702 that a single recoil electron track has been reconstructed in step S701, the process proceeds to step S703 where the energy and the direction of the reconstructed recoil electron track are stored by processor 13 for further processing. Processor 13 may store this information in any of a number of computer-readable media accessible by processor 13, such as RAM 35.

In alternative embodiments of the invention, other conditions besides having multiple recoil electron tracks may be used to disregard a reconstructed recoil electron track. For example, if the reconstructed recoil electron track intersects the edge of detector 11, the determined energy for the recoil electron may be inaccurate since the recoil electron may have continued movement outside the range of detector 11 or sensor 12. In this situation, such a recoil electron track may be removed from further processing to avoid introducing this inaccuracy into the system.

In step S704, the number of reconstructed recoil electrons having a determined energy and direction stored by processor 13 is compared against a data threshold number. The process depicted in FIG. 7 does not proceed to steps S705 and S706 until a specified number of Compton-scattering events have been recorded and associated recoil electron tracks reconstructed. For example, the process may wait for 10 or 20 events to be recorded before processor 13 uses the recorded events to determine/update the direction to the gamma ray source and the energy spectrum of the gamma ray source. In this manner, processing resources can be conserved until the number of recorded events reaches a point that will have a significant impact on the determined/updated direction and energy spectrum. One skilled in the art will recognize that this data threshold may be set to a different value than 10 or 20 without departing from the scope of the invention.

For gamma rays with energy $\geq 0.3$ MeV, the non-coherent Compton-scattering from electrons in the hydrogen and carbon atoms making up polystyrene can be modeled, to a very good approximation, as scattering from free electrons at rest. In that case, conservation of momentum relates the momentum of the incident gamma ray, $p_\gamma$, to the momentum of the scattered gamma ray, $p_{\gamma'}$, and the momentum of the recoil electron $p_e$ by the following equation (4):

$$P_\gamma = P_e + P_{\gamma'} \quad (4)$$

Figure 14:
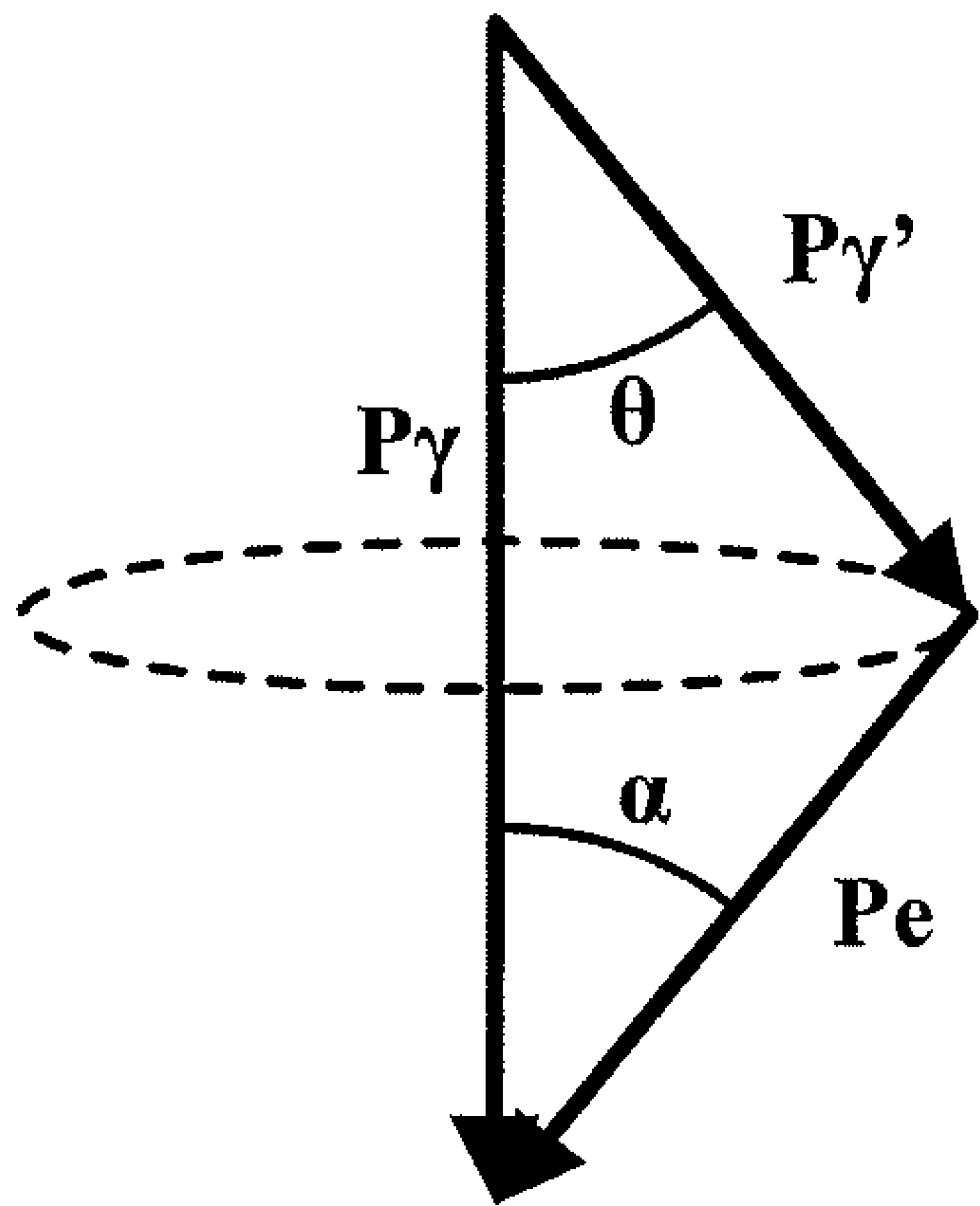
FIG. 14 is a diagram depicting a geometrical relationship between an incident gamma ray, a recoil electron and a Compton-scattered gamma ray.

This relationship is shown geometrically in FIG. 14.

For scattering from unpolarized electrons, the scattering cross-section (the Klein-Nishina equation), is dependant on only the energy of the incoming gamma ray and the angle of scattering θ. That is, $p_{\gamma'}$ is equally likely to be anywhere on the surface of a cone with half-angle θ and, correspondingly, $p_e$ is equally likely to be anywhere on the surface of a cone with half-angle α, where α is the angle between $p_\gamma$ and $p_e$. The scattered gamma ray momentum vector can point in any direction, including backwards (i.e., θ>90°). In contrast, the recoil electron momentum $p_e$ cannot point backwards for that would require that $p_{\gamma'} > p_\gamma$, which would violate energy conservation. Therefore the recoil electron momentum always has a component parallel to $p_\gamma$ (i.e., α is always <90°) and, due to the above noted symmetry of the Klein-Nishina equation, the mean value of $p_e$ (over a statistical ensemble of gamma rays incident from the same direction) is in the same direction as $p_\gamma$. This is the basis for determining the direction to the gamma-ray source from single Compton-scatterings of incident gamma rays.

In step S705, the direction to the gamma ray source is determined based on the determined direction of the recoil electron. As noted above, for each single Compton-scattering event for which a recoil electron track is reconstructed by processor 13, the direction of the recoil electron track is stored in one or more computer-readable media by processor 13. The direction to the gamma ray source is determined by processor 13 by computing the mean of the directions of the stored recoil electron tracks. As more recoil electron tracks are reconstructed, processor 13 re-computes and updates the direction to the gamma ray source by incorporating the new recoil electron directions in the mean calculation in step S705 once the number of new recoil electron tracks exceeds the number of the data threshold.

As the number of recorded Compton-scattering events increases, the accuracy of the determined direction to the gamma ray source increases as well. In general, the error in the determined direction to the gamma ray source is approximately the range of directions determined for the recoil electrons divided by the square root of the number of reconstructed recoil electrons included in the direction determination. Factors that will affect the accuracy of gamma vector camera 10 include the strength of the gamma ray source, the distance between the gamma ray source and gamma vector camera 10, the amount of background noise (i.e., gamma rays from other sources besides the desired gamma ray source), etc.

To account for changing positions of the gamma ray source and/or gamma vector camera 10, the number of recorded recoil electrons used to calculate the direction to the gamma ray source may be limited to a specified number of events. For example, processor 13 may use only the most recent 200 or 300 recorded events when calculating the direction to the gamma ray source. By using the most recent recorded events, old direction and energy data identifying a location and source which has since changed is slowly phased out of the processing. One skilled in the art will recognize that the number of reconstructed recoil electrons included in the processing may vary from 200 or 300 without departing from the scope of the invention.

Once the direction to the gamma ray source has been determined/updated in step S705, the process proceeds to step S706 where the energy spectrum of the gamma ray source is determined. Using the relationship represented in equation (4) above, the energy of the incident gamma ray is represented in the following equation (5):

$$E_\gamma = K_e + E_{\gamma'} \quad (5)$$

where $E_\gamma$ is the energy of the incident gamma ray γ, $K_e$ is the kinetic energy of the recoil electron, and $E_{\gamma'}$ is the energy of the Compton-scattered gamma ray γ'. The relativistic relation between the energy of the photon and the magnitude of its momentum is given by equation (6) shown below, $$E_\gamma = p_\gamma c \quad (6)$$

where c is the speed of light. The relativistic relation between the magnitude of the electron momentum and its kinetic energy is given by equation (7) shown below, $$p_e = \sqrt{\frac{K_e^2}{c^2} + 2mK_e} \quad (7)$$

where m is the mass of the electron.

Equation (4) can be rewritten as follows:

$$p_{\gamma'} = p_e - p_\gamma \quad (4a)$$

Squaring equation (4a) produces equation (8) below:

$$p_{\gamma'}^2 = p_e^2 + p_\gamma^2 - 2p_e p_\gamma \cos(\alpha) \quad (8)$$

Substituting equation (5) into equation (6) yields equation (9) below:

$$p_{\gamma'} = \frac{E_{\gamma'}}{c} = \frac{E_\gamma - K_e}{c} \quad (9)$$

Using equations above for $p_e$ and $p_{\gamma'}$ equation (10) is generated:

$$(E_\gamma - K_e)^2 = K_e^2 + 2mc^2 K_e + E_\gamma^2 - 2\sqrt{K_e^2 + 2mc^2 K_e}\, E_\gamma \cos(\alpha) \quad (10)$$

Solving for $E_\gamma$ results in equation (11) below:

$$E_\gamma = \frac{mc^2}{\sqrt{1 + \frac{2mc^2}{K_e}\cos(\alpha) - 1}}. \quad (11)$$

Using the mean direction to the gamma ray source determined in step S705, the energy spectrum of the gamma ray source is determined in step S706 using equation (11). As indicated above, each reconstructed recoil electron track is stored by processor 13. In step S706, the energy of an incident gamma ray associated with each reconstructed recoil electron track is determined using equation (11). Processor 13 stores the determined energy for each of the incident gamma rays on a computer-readable medium. The energy spectrum of the gamma ray source is represented by the collection of determined energies for the incident gamma rays. As more recoil electrons are reconstructed in the process, the energy spectrum of the gamma ray source is updated to include the new incident gamma ray energy associated with the reconstructed recoil electron. Similar to step S705, the energy spectrum of the gamma ray source is determined/updated once the number of reconstructed recoil electrons reaches the data threshold. In addition, the energy spectrum may be determined using a specified number of the most recent reconstructed recoil electron tracks, as described above with respect to step S705.

Processor 13 is configured to store and make the energy spectrum and the direction to the gamma ray source available through any of a number of mechanisms. For example, the determined direction may be used to control the movement of a video camera, thereby keeping the video camera pointed at the location of a gamma ray source. In this manner, a moving gamma ray source can be detected and tracked using one or more gamma vector cameras according to the present invention. The determined direction to the gamma ray source also may be used to overlay graphics on a video or still image captured by a camera aligned with the gamma vector camera. Alternatively, if the gamma vector camera is mounted on a moving vehicle such as a helicopter, the direction of the vehicle can be guided using the determined direction to lead the vehicle to the gamma ray source.

Both the determined energy spectrum and the direction to the gamma ray source may be displayed to a user on a monitor coupled to processor 13. The information may be presented in a number of different graphical representations. For example, the energy spectrum of the gamma ray source may be represented using a histogram of the different energies determined for the different incident gamma rays associated with the reconstructed recoil electrons.

The foregoing description is provided to enable one skilled in the art to practice the various embodiments of the invention described herein. Various modifications to these embodiments will be readily apparent to those skilled in the art, and generic principles defined herein may be applied to other embodiments. Thus, the following claims are not intended to be limited to the embodiments of the invention shown and described herein, but are to be accorded the full scope consistent with the language of the claims. All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A gamma vector camera for detecting and determining the energy spectrum of a gamma ray source and the direction to the gamma ray source, said gamma vector camera comprising:

a detection system configured to detect and record a track of a recoil electron produced by a Compton-scattering of an incident gamma ray emitted by the gamma ray source; and a processor configured to determine the energy and the direction of the recoil electron based on the track of the recoil electron recorded by said detection system, and to determine the energy spectrum of the gamma ray source and the direction to the gamma ray source based on the determined energies and directions of a plurality of recoil electrons produced by the Compton-scatterings of a respective plurality of incident gamma rays.

2. The gamma vector camera according to claim 1, wherein said processor is configured to determine the direction to the gamma ray source based on an average of the determined directions of the plurality of recoil electrons.

3. The gamma vector camera according to claim 2, wherein said processor is configured to determine the energy spectrum of the gamma ray source based on the determined energies of the plurality of recoil electrons and the angle between the determined directions of the plurality of recoil electrons and the determined direction to the gamma ray source.

4. The gamma vector camera according to claim 1, wherein said detection system comprises:
 a detector that generates scintillation light upon interaction with the recoil electron; and
 a sensor configured to record the locations and the intensities of the scintillation light generated by said detector,
 wherein said processor is configured to determine the energy and the direction of the recoil electron based on the locations and the intensities of the scintillation light recorded by said sensor.

5. The gamma vector camera according to claim 4, wherein a length, a width and a height of said detector are each less than or equal to the mean free path of the incident gamma ray in said detector.

6. The gamma vector camera according to claim 4, wherein a length, a width and a height of said detector are each between two and four times the range of the recoil electron in said detector.

7. The gamma vector camera according to claim 4, wherein said detector comprises a plurality of layers arranged on respective parallel planes, wherein each layer comprises a plurality of fiber-optic scintillators arranged parallel to each other on the plane of the layer in a direction orthogonal to the direction of the fiber-optic scintillators in adjacent layers.

8. The gamma vector camera according to claim 7, wherein said sensor comprises:
 a first photo sensor for recording the locations and the intensities of scintillation light generated by a plurality of the fiber-optic scintillators arranged in a first direction; and
 a second photo sensor for recording the locations and the intensities of scintillation light generated by a plurality of the fiber-optic scintillators arranged in a second direction orthogonal to the first direction.

9. The gamma vector camera according to claim 8, wherein said first photo sensor comprises a first photo sensor array having a plurality of elements in correspondence with the plurality of the fiber-optic scintillators from which said first photo sensor detects scintillation light, said second photo sensor comprises a second photo sensor array having a plurality of elements in correspondence with the plurality of the fiber-optic scintillators from which said second photo sensor detects scintillation light, and wherein the locations of the scintillation light are determined based on which elements of the first and second sensor arrays detect the scintillation light.

10. The gamma vector camera according to claim 9, wherein said sensor further comprises:
 a first fast sensor array corresponding to said first photo sensor, wherein said first fast sensor array comprises a plurality of elements with each element corresponding to a respective plurality of the elements of said first photo sensor array; and
 a second fast sensor array corresponding to said second photo sensor, wherein said second fast sensor array comprises a plurality of elements with each element corresponding to a respective plurality of the elements of said second photo sensor array,
 wherein in response to one of the plurality of fast sensor array elements detecting scintillation light in said detector, the locations and the intensities of the scintillation light are detected using the corresponding plurality of photo sensor array elements.

11. The gamma vector camera according to claim 9, wherein said sensor further comprises:
 a first image intensifier coupling the plurality of fiber-optic scintillators arranged in the first direction to said first photo sensor array; and
 a second image intensifier coupling the plurality of fiber-optic scintillators arranged in a second direction to said second photo sensor array,
 wherein said first and second photo sensor arrays are configured to record the locations and the intensities of the scintillation light generated in said detector upon a coincident detection of light in said first and second image intensifiers.

12. A gamma vector camera for detecting and determining the energy spectrum of a gamma ray source and the direction to the gamma ray source, said gamma vector camera comprising:
 detection means for detecting and recording a track of a recoil electron produced by a Compton-scattering of an incident gamma ray emitted by the gamma ray source; and
 processing means for determining the energy and the direction of the recoil electron based on the track of the recoil electron recorded by said detection means, and to determine the energy spectrum of the gamma ray source and the direction to the gamma ray source based on the determined energies and directions of a plurality of recoil electrons produced by the Compton-scatterings of a respective plurality of incident gamma rays.

13. A method for detecting and determining the energy spectrum of a gamma ray source and the direction to the gamma ray source, the method comprising the steps of:
 recording tracks of a plurality of recoil electrons produced by Compton-scattering of a respective plurality of incident gamma rays emitted by the gamma ray source;
 determining the energies and the directions of the plurality of recoil electrons using the recoil electron tracks recorded in said recording step; and
 determining the energy spectrum of the gamma ray source and the direction to the gamma ray source using the determined energies and directions of the plurality of recoil electrons.

14. The method according to claim 13, wherein said second determining step comprises averaging the determined directions of the plurality of recoil electrons to determine the direction to the gamma ray source.

15. The method according to claim 14, wherein said second determining step further comprises determining the energy spectrum of the gamma ray source using the angles between the determined directions of the plurality of recoil electrons and the determined direction to the gamma ray source.

16. The method according to claim 13, wherein said recording step comprises recording the locations and the intensities of scintillation light generated by a detector upon interaction with the plurality of recoil electrons.

17. The method according to claim 16, wherein the detector comprises a plurality of fiber-optic scintillators, and wherein for each of the fiber-optic scintillators that generates scintillation light, the location of the fiber-optic scintillator and the intensity of the scintillation light generated by the fiber-optic scintillator are recorded in said recording step.

18. A computer-readable medium having computer-executable instructions stored thereon for execution by a processor to perform a method for determining the energy and the direction of a gamma ray source, the method comprising the steps of:

recording tracks of a plurality of recoil electrons produced by Compton-scattering of a respective plurality of incident gamma rays emitted by the gamma ray source;

determining the energies and the directions of the plurality of recoil electrons using the recoil electron tracks recorded in said recording step; and determining the energy spectrum of the gamma ray source and the direction to the gamma ray source using the determined energies and directions of the plurality of recoil electrons.

19. The computer-readable medium according to claim 18, wherein said second determining step comprises averaging the determined directions of the plurality of recoil electrons to determine the direction to the gamma ray source.

20. The computer-readable medium according to claim 19, wherein said second determining step further comprises determining the energy spectrum of the gamma ray source using the angles between the determined directions of the plurality of recoil electrons and the determined direction to the gamma ray source.

21. The computer-readable medium according to claim 18, wherein said recording step comprises recording the locations and the intensities of scintillation light generated by a detector upon interaction with the plurality of recoil electrons.

22. The computer-readable medium according to claim 21, wherein the detector comprises a plurality of fiber-optic scintillators, and wherein for each of the fiber-optic scintillators that generates scintillation light, the location of the fiber-optic scintillator and the intensity of the scintillation light generated by the fiber-optic scintillator are recorded in said recording step.

* * * * *